United States Patent [19]

Thor

[11] Patent Number: 4,916,448
[45] Date of Patent: Apr. 10, 1990

[54] LOW ALTITUDE WARNING SYSTEM FOR AIRCRAFT

[75] Inventor: Wayne Thor, New Carlisle, Ohio

[73] Assignee: The United States of America as represented by the Secretary of the Air Force, Washington, D.C.

[21] Appl. No.: 163,902

[22] Filed: Feb. 26, 1988

[51] Int. Cl.⁴ .............................................. G08B 23/00
[52] U.S. Cl. .................................... 340/970; 340/963; 342/65; 364/433
[58] Field of Search ........................ 340/963, 967, 970; 73/178 T; 244/180, 181; 342/65; 364/433, 434, 424

[56] References Cited

U.S. PATENT DOCUMENTS

| | | | |
|---|---|---|---|
| 2,736,878 | 2/1956 | Boyle, Jr. | 340/970 |
| 3,530,465 | 9/1970 | Treffeisen et al. | |
| 3,934,221 | 1/1976 | Bateman et al. | |
| 3,946,358 | 3/1976 | Bateman | |
| 3,947,809 | 3/1976 | Bateman | 342/65 |
| 4,030,065 | 6/1977 | Bateman | 340/970 |
| 4,058,710 | 11/1977 | Altmann | 364/433 |
| 4,121,287 | 10/1978 | Leal et al. | 364/461 |
| 4,431,994 | 2/1984 | Gemin | 340/970 |
| 4,567,483 | 1/1986 | Bateman et al. | 340/970 |
| 4,639,730 | 1/1987 | Paterson et al. | 340/970 |
| 4,675,823 | 6/1987 | Noland | 340/970 |
| 4,792,799 | 12/1988 | Grove | 340/963 |

FOREIGN PATENT DOCUMENTS

| | | | |
|---|---|---|---|
| 1033828 | 6/1978 | Canada. | |
| 2139588A | 11/1984 | United Kingdom | 340/970 |
| 2139589A | 11/1984 | United Kingdom | 340/970 |
| 8706044 | 10/1987 | World Int. Prop. O. | 340/970 |

OTHER PUBLICATIONS

"A Low Altitude Warning System for Prevention of Controlled Flight into Terrain", IEEE 1987 NAECON, vol. 2, pp. 544–551, Shah et al.

"Low Altitude Warning System (LAWS) Test", Brennan et al., Feb. 1986, Report AD-TR-86-5 from DT IC.

"A-10 Ground Collision Avoidance System (GCAS) Test", Pulsipher, Sep. 1987, Report AD-TR-87-54.

Primary Examiner—Joseph A. Orsino
Assistant Examiner—Brent A. Swarthout
Attorney, Agent, or Firm—Bernard E. Franz; Donald J. Singer

[57] ABSTRACT

To provide a predictive emergency warning to the pilot of flight and terrain conditions which will result in a collision with the ground unless the pilot takes immediate action, without issuing excessive nuisance warnings, the system uses input parameters from other aircraft systems such as the radar altimeter, Inertial Navigation System, and Central Air Data Computer which are processed in an on-board computer to determine when a warning is required. A software program which is part of the warning system provides a logic link between the on-board aircraft parameters and the on-board voice command ("pull-up, pull-up"). The software program is readily adaptable to all aircraft applications with varying amounts of modification depending on specific mission requirements for which this protection is required. A feature is the use of a continuously computing predictive warning algorithm (based on classical flight dynamics equations) in combination with unique inhibit logic equations. Another feature is the introduction of "extended coverage" logic which permits the altitude dependent, time limited use of an alternate (other than radar) altitude reference signal when the radar altimeter is beyond limits.

5 Claims, 8 Drawing Sheets

LAWS RADAR ALTIMETER (TERRAIN) INS FILTER IN LAPLACE BLOCK DIAGRAM FORMAT (FREQUENY DOMAIN)

$WN = 1/T \sqrt{\beta/1-\alpha}$ $\xi = \sqrt{1-\alpha/2-\alpha}$

BETA OPTIMUM = $\alpha^2/2-\alpha$

Fig. 5C  FILTER LOGIC AND EQUATIONS

LOW ALTITUDE WARNING SYSTEM FOR AIRCRAFT

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a low altitude or ground proximity warning system, particularly for fighter aircraft.

Ground proximity warning systems that warn of a hazardous condition are known. Examples of such systems are disclosed in several U.S. patents to Bateman, including U.S. Pat. Nos. 3,934,221 and 3,946,358, on a Ground Proximity Warning System (GPWS) assigned to Sunstrand Data Control, Inc. These systems monitor the radio altitude and the radio altitude closure rate, and generate a warning if the rate of closure rate is excessive for the altitude at which the aircraft is flying. While these systems do provide a way to warn the pilot of a hazardous condition resulting from an excessive closure rate with terrain, these systems are designed for use in transport aircraft, and not for use in high performance tactical aircraft such as fighter or attack aircraft whose flight and operational characteristics are substantially different than those of transport aircraft. Consequently, the systems designed for transport aircraft can provide false warnings during certain normal operational conditions of a tactical aircraft, and provide no warning or an inadequate warning during other flight conditions.

Canadian Pat. No. 1,033,828 to Cheng et al and assigned to Litton Industries on a "Digital Ground Proximity System for Reducing False Warnings" discloses a system which stores a representation of a warning envelope which is a function of a warning parameter vs. radar height. A device iteratively makes a determination to provide a warning signal if the aircraft flight conditions place it within the warning envelope.

Other U.S. patents of interest include U.S. Pat. Nos. 3,530,465 to Treffeisen et al, 4,058,710 to Altmann, 4,121,287 to Leal et al.

The operational and flight characteristics of a high performance aircraft such as a fighter or an attack aircraft are considerably different than those of a transport aircraft. For example, it is quite common for a high performance tactical aircraft such as a fighter or attack aircraft to fly at low level over various terrain including rising and falling terrain. Much of the low altitude flying is done at high speed and steep attitudes, and consequently, it is possible for the pilot inadvertently to fly the aircraft into terrain, particularly if the aircraft is being flown over gradually rising terrain. Consequently, it is desirable to provide the pilot with a warning of an impending flight into terrain with sufficient time to permit him to take corrective action. However, systems designed for transport aircraft generally would not provide suitable warnings, since such aircraft typically do not fly at the relatively low cruise altitude flown by tactical aircraft. As a result, systems designed for transport aircraft would tend to give inadequate and false warnings, and such warnings would be a nuisance to the pilot.

Patterson et al U.S. Pat. No. 4,639,730, also assigned to Sunstrand, is a warning system for tactical aircraft, that monitors the closure rate of the aircraft when the weapons are not armed, the aircraft is flying between 100 and 1,800 feet, and the airspeed exceeds 200 knots, and provides a warning to the pilot if the radio altimeter rate exceeds a predetermined safe limit for the radio altitude at which the aircraft is flying.

Controlled Flight Into Terrain (CFIT) constitutes a large category of mishaps. A CFIT occurs when the pilot's attention is diverted, or when the pilot becomes disoriented. CFIT warning systems have been mandatory on commerical aircraft since 1976. The Air Force has installed systems on some transport aircraft. However, considering the mission scenarios and performance capabilities of fighter/attack aircraft, these systems have not proved suitable to tactical situations. There is a need to provide improved warning systems for tactical aircraft.

Low altitude or ground proximity warning systems have proven to be unsatisfactory to the user pilots primarily due to excessive nuisance warnings being generated. In addition, warning protection was not adequately provided for all mission tasks which required protection. The problems of protecting fighter aircraft which fly hard maneuvers close to the ground while trying to attack or escape is immensely more difficult than providing warning protection to high flying low maneuverability aircraft which have no other requirement than to fly smoothly from point A to B. Previous attempts to adapt commercial warning systems to fighter aircraft failed. Further, due to the cumbersome design approach which required large amounts of information stored in memory, the similar warning systems required dedicated computers. In addition to this having been demonstrated to be significantly more expensive than inbedding warning system logic into on-board computers (which is generally not possible with large memory progrmas) there is the physical size and cooling requirements of an additional computer which, for the F-16 for example, was impossible to accommodate. Physical space requirements on a large aircraft are not generally limiting.

SUMMARY OF THE INVENTION

An objective of the invention is to provide a predictive emergency warning to the pilot of flight and terrain conditions which will result in a collision with the ground unless the pilot takes immediate action, without issuing excessive nuisance warnings.

This Low Altitude Warning System (LAWS) uses input parameters from other aircraft systems such as the radar altimeter. INS (Inertial Navigation System) and air data computer which are processed in an on-board computer to determine when a warning is required. A software program which is part of the warning system provides a logic link between the on-board aircraft parameters and the on-board voice command ("pull-up, pull-up"). The software program is readily adaptable to all aircraft applications with varying amounts of modification depending on specific mission requirements for which this protection is required.

The primary new feature that distinguishes this warning system concept from others is the use of a continuously computing predictive warning algorithm (based on classical flight dynamics equations) in combination with unique inhibit logic equations.

Another original feature is the introduction of "extended coverage" logic which permits the altitude dependent, time limited use of an alternate (other than radar) altitude reference signal when the radar altimeter is beyond limits. In addition to the new concept of using inhibits to prevent new warnings, each of the inhibit logic equations are themselves original and unique having been determined during development.

The system with the above new features has the following advantages over the previous attempts:

(1) Unlike previous attempts at solving the low altitude warning system problem for fighter aircraft, which store large amount of aircraft data and use a table lookup type of logic, this approach minimizes the computer memory requirements. The memory requirements for this approach are smaller than previous approaches and make this warning system readily imbeddable in existing on-board computers. This lowers acquisition cost as well as facilitating retrofit on existing aircraft.

(2) This warning system concept with inhibit logic allows for the greatest flexibility of application across aircraft types while maximizing effectiveness (most coverage with least nuisance warnings) in that the predictive warning equation is the same for all aircraft (only gain values need change) while the inhibit logic can readily be expanded or reduced to tailor (or optimize) application for unique missions or aircraft.

(3) Another advantage is the inherent gear-up warning which will occur (due to the non-predictive call at the minimum design altitude) if the pilot attempts a landing with the gear retracted.

(4) An advantage which comes from the "extended coverage" logic is that a measure of warning protection is provided even beyond the limits of the radar coverage. This coverage is altitude dependent and time limited since it activates when ground reference is temporarily lost.

(5) This warning system concept is the only one to date that has been given a satisfactory rating by TAC evaluation pilots based on flight test results.

This warning system logic achieves minimum cost since this approach minimizes computer memory requirements and processing time thereby making it easy to accomodate in an on-board computer as well as a dedicated microprocessor.

The primary use of equations (as opposed to memory) and the inhibit logic concept is the reason for the demonstrated effectiveness, low cost, and ease of applicability across different aircraft.

Other attempts at using predictive classical equations have to date been unsatisfactory due in part to the lack of using inhibit logic to provide maximum protection with a minimum of nuisance warnings.

REPORTS

There are two unpublished flight test reports. The first is technical report AD-TR-86-5 titled "*Low-Altitude Warning System (LAWS) Test*" by W. R. Brennan et al with a nominal date of February 1986, which is part of the DTIC (Defence Technical Information Center) collection of documents accession No. AD B100 558L. The second flight test report is technical report AD-TR-87-54 titled "A-10 Ground Collision Avoidance System (GCAS) Test" by J. H. Pulsipher with a nominal date of September 1987. Copies of these two flight test reports are included with this patent application as filed, and are hereby incorporated by reference.

The system is also described in a paper by Diane Shaffer Shah and Lt. Bob Lombardi, titled "A Low Altitude Warning System for Prevention of Controlled Flight into Terrain" in the Proceedings of the IEEE 1987 National Aerospace and Electronics Conference NAECON 1987, Vol. 2, pages 544-551. This paper is also hereby incorporated by reference.

Table 1 provides a set of equations for preliminary calculations;

Table 2 provides a set of equations for predictive factors;

Table 3 provides a set of equations for inhibit logic;

Table 4 provides a set of definitions of terms;

Table 5 provides a set of equations for a radar map.

DESCRIPTION OF THE PREFERRED EMBODIMENT

This Low Altitude Warning System (LAWS) was developed to give an emergency warning of impending Controlled Flight Into Terrain (CFIT) It is a passive warning system, meaning it does not initiate automatic recovery. A single voice warning of "Pull-up, pull-up" is issued when the pilot commits a ground clearance error. The warning is meant to alert the pilot of impending CFIT.

The design philosophy of the algorithm is that the pilot should not depend on the system to avoid terrain. If the pilot does not commit a ground clearance error, he should never hear a warning. If the pilot does hear a warning, he may be assured that he has committed an aircraft-to-ground clearance error. This philosophy leaves responsibility and control in the pilot's hands while guaranteeing a level of CFIT protection which otherwise would not exist.

A unique LAWS design philosophy concerns the load factor to be used during dive recovery. Rather than being designed to a four or five g in two seconds loading, LAWS requires the pilot to use the maximum load factor available for his airspeed. This results in warnings at lower altitudes, fewer nuisance warnings, and requires a high performance recovery.

The LAWS was also the first CFIT protection algorithm to use a state-space approach rather than an empirical approach. It computes the warning height based on current aircraft parameters. These are used in equations computing the altitude that would be lost for pilot reaction, roll-out to near wings-level, and dive recovery.

SYSTEM DESCRIPTION

The low altitude warning system comprises an algorithm, a radar altimeter, and a voice synthesizer.

HARDWARE

Figure 1:
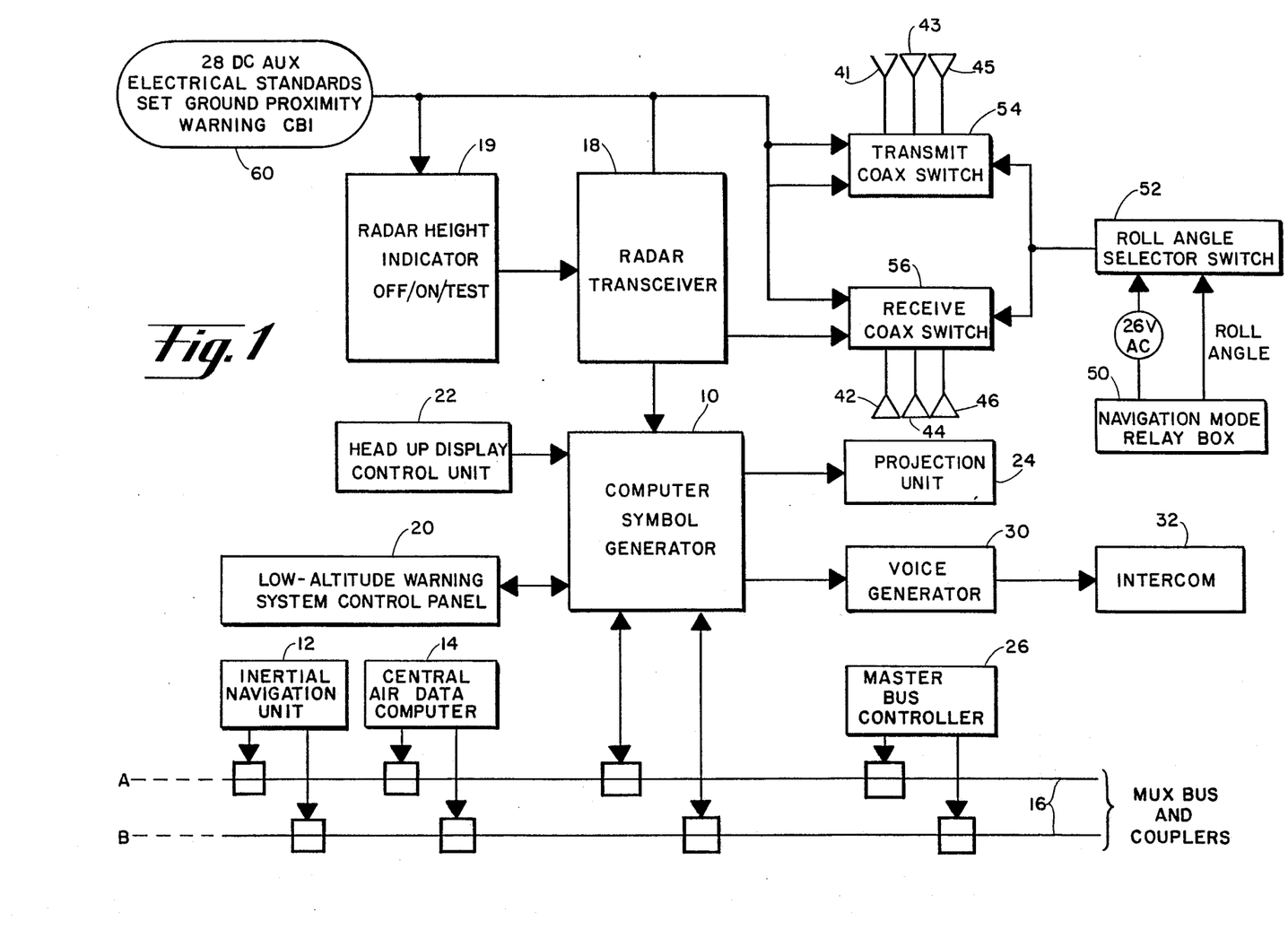
FIG. 1 is a block diagram of the hardware used for the low altitude warning system.
Figures 6, 7:
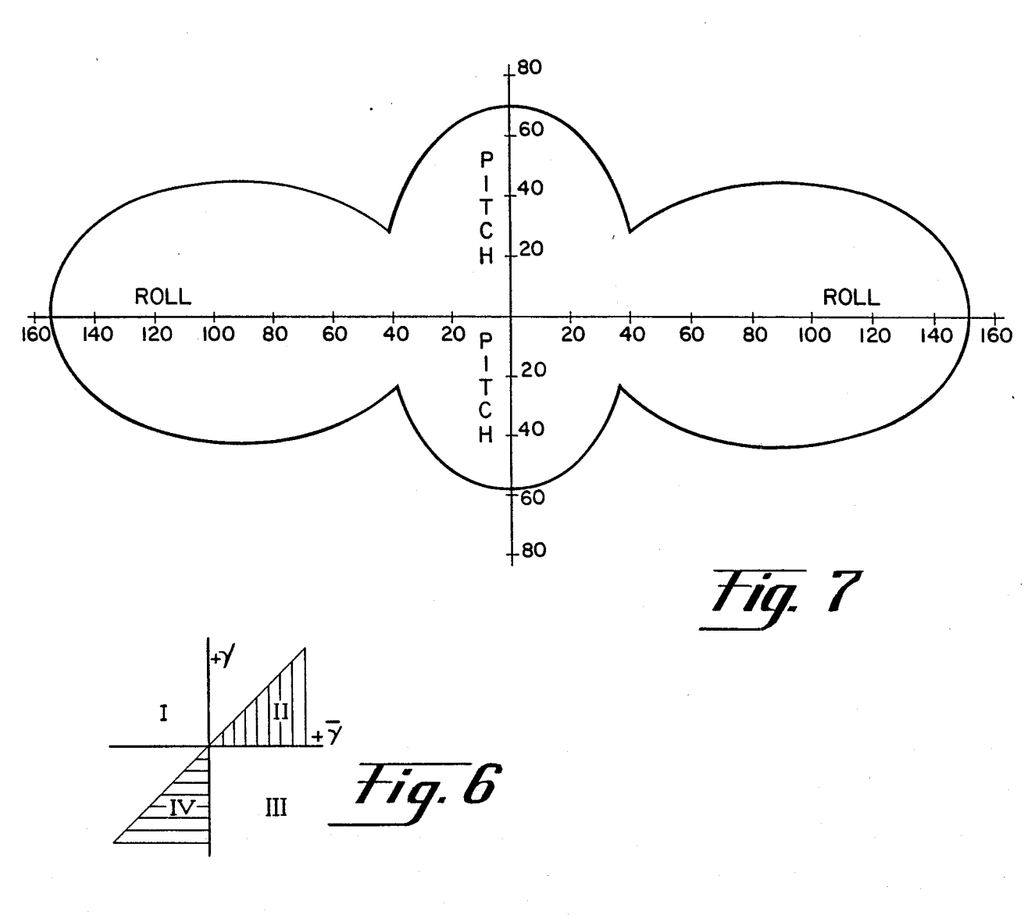
FIG. 6 is a diagram for use with Table 2.
FIG. 7 is a diagram of the radar coverage map.

The LAWS was integrated into the A-10 fighter aircraft HUD (heads up display) system for the flight tests, as shown in the block diagram of the hardware in FIG. 1. A computer symbol generator (CSG) 10, part of the HUD, receives air data from a central air data computer (CADC) 14 and inertial information from an inertial navigation system (INS) 12 through a data bus 16 (Mil Spec 1553A), radar altitude information from a radar transceiver 18, and clearance altitude from a LAWS control panel 20 to constantly monitor the aircraft relationship with the ground. The HUD also includes a heads up display control unit 22 and a projection unit 24. The bus system includes a master bus controller 26. Minimal hardware addition is necessary for the LAWS installation, including a voice warning unit or voice generator 30 with a voice box or intercom 32, and the radar altimeter 18 with the necessary antennas. There are three antenna pairs 41-42, 43-44 and 45-46, each containing a transmit and receive antenna, located on the center bottom of the horizontal tail and on the sides of the vertical tail. Only one antenna pair is in operation at one time, depending on the aircraft roll angle. Roll data from a navigation mode relay box 50 is sent to a selector switch 52, which provides a discrete signal to activate the selected antenna pair via transmit coax switches 54 and receive coax switches 56. The radar coverage is approximately ±60 degrees pitch and ±150 degrees roll. This coverage resulted from a study of the typical close air support mission. A set of radar map equations is shown in Table 5, and a diagram of the radar coverage map is shown in FIG. 7.

A radar height indicator 19 is a display unit which receives altitude signals from the radar transceiver 18. It includes a low-altitude warning light, as well as power off/on, altitude limit setting, and test features.

The LAWS control panel 20 contains switches that allow the pilot to set the clearance altitude and the minimum altitude, and a LAWS inoperative (INOP) light that illuminates if the CSG 10 fails, or if the CSG receives an invalid inertial navigation unit (INU), central air data computer (CADC), or radar altimeter signal.

System power at 28 volts DC from a DC AUX ESS circuit breaker panel 60 is supplied to the units 18, 19, 20, 54 and 56. The roll angle selector switch 52 receives a 26 volts AC power through the relay box 50.

FLOW CHART

A 15-page program listing in FORTRAN is included herewith as an appendix.

Figure 2:
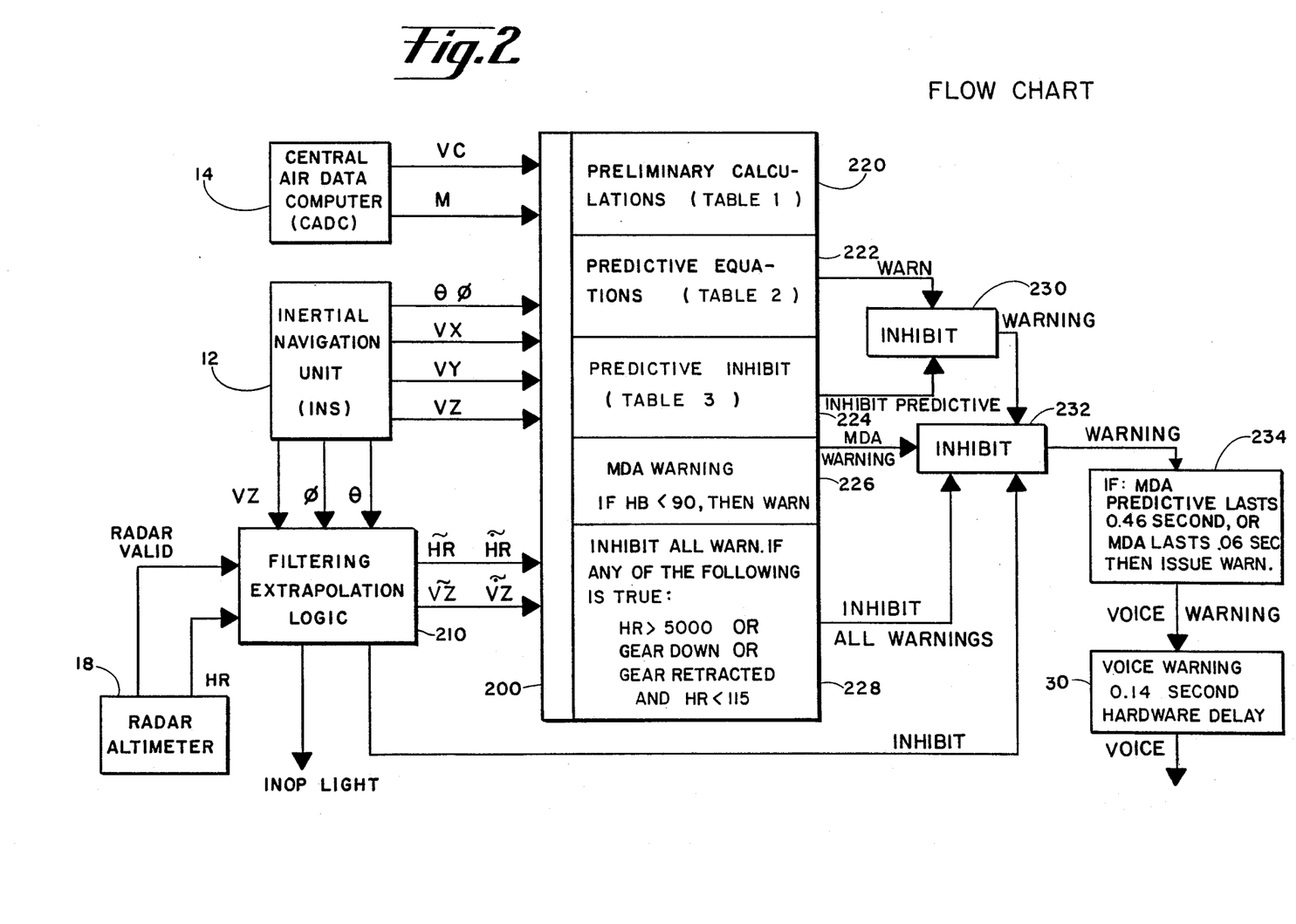
FIG. 2 is a flow chart block diagram showing the operation of the low altitude warning system.

The flow chart in FIG. 2 shows the hardware units 12, 14, 18 and 30 from FIG. 1 for input and output. The software program includes a filtering extrapolation logic block 210, a main algorithm block 200, output inhibit blocks 230 and 232, and a logic filter (issue warning) block 234. The main algorithm block 200 is divided into a preliminary calculations block 220 (see Table 1), a predictive equations block 222 (see Table 2), a predictive inhibit block 224 (see Table 3), a MDA warning block 226, and an inhibit all warnings block 228.

Inputs

Inputs to the LAWS algorithm are as follows; inertial velocities (Vx, Vy, Vz), pitch and bank angles (theta, phi), and an "inop" signal from the Inertial Navigation System (INS) 12: calibrated airspeed (Vc), mach (M), and an "inop" signal from the Central Air Data Computer (CADC) 14; filtered signals of Vz, radar altitude (Hr), and rate of change of Vz and radar altitude from a low-pass (alpha-beta) filter 210. The filter receives inputs from the INS 12 and radar altimeter 18, creates rate information, performs extrapolation logic and outputs signals to the "inop" lights. (Mach (M) is defined as true airspeed divided by the speed of sound at the current air pressure and temp.)

Warning Computation

The warning algorithm consists of two parts, a predictive warning calculation and a minimum design altitude (MDA) warning calculation. There are two types of inhibits; those which block a predictive warning and those which block all warnings.

Persistence

The predictive warning must persist for 0.46 seconds (23 frames for a 50 Hz operation) to activate the warning signal to the pilot. The MDA warning must persist 0.06 seconds (3 $\Delta T=0.02$ sec. frames) before a warning is issued. There is an added 0.14 second hardware delay in the activation of the voice signal.

Minimum Design Altitude

The MDA warning is issued when the aircraft descends below 90 feet above ground level, (the altitude that the aircraft should never penetrate gear up).

Predictive Warning

The predictive portion of the algorithm issues a warning based on a prediction of the time necessary for recovery based on pilot reaction time, flight path angle, MDA, bank angle, airspeed, and terrain slope. The predictive part issues a warning if the sum of the following predictive factors is greater than the radar altitude. Table 2 includes the equations showing how the following predictive factors i-iv are calculated.

i. $\Delta HD$ = dynamic altitude effect (accounts for altitude lost until pilot reacts, includes a bank angle factor, and includes an empirical determination for g-onset). Referring to the first equation of Table 2, the determination for g-onset is a computed load factor as a function of the rate of change of the filtered vertical inertial velocity $\tilde{V}_z$ multiplied by a factor which includes the absolute value of the bank angle $\phi$ and predetermined constants (3.125 and 3.13/180).

ii. $HDB$ = dynamic bias (account for MDS, bank angle, flight path angle, airspeed, and contains a Mach correction factor. This factor contains many empirically chosen correction factors).

iii. $\Delta HM$ = dive recovery factor (Calculates recovery arc for a steady state dive recovery from an excessive closure with terrain condition to get to flight path parallel to terrain. This is a simplistic calculation based on a constant g, constant velocity dive recovery). The second equation of Table 2 shows this calculation based on a constant flight path angle $\gamma$ and terrain slope angle $\gamma$, maximum load factor $N_zM$ and constant velocity $V_I$ at the time of the warning.

iv. $\Delta HT$ = terrain extrapolation equation (accounts for terrain growth based on slope of terrain. This is a hybrid of both rolling and diving type of maneuvers to arrive at predicted horizontal travel across terrain during recovery).

Predictive Warning Inhibits

A predictive warning is inhibited if any of the following conditions are true:

i. The dive angle is shallow (less than 5 degrees down) and aircraft bank angle is outside of 75-to-110 degrees region. This ridge clip inhibit is based on the fact that a 90 foot call would give the pilot approximately 2 seconds at 300 KIAS (knots indicated airspeed) to recover. The pilot is situationally aware unless he is in the high bank region in which case, he will get approximately 300 ft. of altitude at the warning. In addition, Air Force history shows that there is a high improbability of CFIT for the wings-level circumstance.

ii. The slope of terrain is steep (greater than 18 degrees). History shows the chance of a CFIT for steep terrain is small.

iii. The rate of closure is not excessive (less than 200 ft/sec down), and upward acceleration is sufficiently positive (at least 10 ft/sec/sec), indicating the pilot has already initiated a recovery.

iv. The rate of closure is small (less than 10% of total velocity). When the difference between the flight path angle and ground slope is a shallow angle (for 300 knots), the closure rate is slow enough to preclude a predictive warning.

v. The aircraft is in a bunt maneuver (load factor <0.5 G, dive angle <15 degrees, and bank angle <30 degrees). This type of maneuver occurs only as result of deliberate pilot action. Since the warning system is based on Visual Flight Reference (VFR), and CFITs occur when the pilot has lost track of his air-to-ground relationship, a warning would likely be a "nuisance" call for this instance.

vi. The velocity is less than 150 kts. Slow speed like this typically occurs only during landing.

Outputs

Outputs from the algorithm are a LAWS "inop" signal and a warning cue which activate the voice box via the voice generator 30. The "inop" signal denotes the radar altitude has broken lock for more than one second while inside the radar map.

Take-Off and Landing

For take-off, LAWS is activated after the gear is up and the altitude ascends past 115 feet. This same logic follows for a go-around. Landing is handled by blocking the warning when the gear is down and the altitude is less than 1,500 feet.

FILTER LOGIC and EQUATIONS

The following FILTER TERMINOLOGY is used:

TOD—Time of day—Time during flight calculated by adding the time of each iteration cycle from the start of the flight.

JSAVE—Value of the J flag saved from the last iteration.

HN-1—Radar altitude at the last iteration.

HPN—Predicted value of radar altitude based on the last value and the last rate.

HRF—Filtered value of radar altitude.

HRLG—Last good value of radar altitude.

HRAV—Average radar altitude.

HRDER—Value of radar altitude derived during extrapolation.

TE—The length of time allowed to extrapolate.

TEND—The time at which the extrapolation logic will stop coverage.

TLITE—The time when a LAWS "inop" light will come on. This occurs when the radar altimeter loses lock inside the radar map for over one second.

VZPREV—Previous value of VZ.

HR VALID—The validity bit determining whether radar altimeter is providing correct information.

HR<5K—The test radar altimeter worked only up to 5,000 feet and limited the warning capability.

CADC—Central Air Data Computer.

INS—Inertial Navigation System.

M—Mach number.

VC—Calibrated airspeed.

C—Asks the question are we inside the radar map?

$\theta < \theta_C$—If true the airplane is inside the radar map.

I1, I2, I3, J—These flags are set to keep track of the radar validity.

Figure 4:
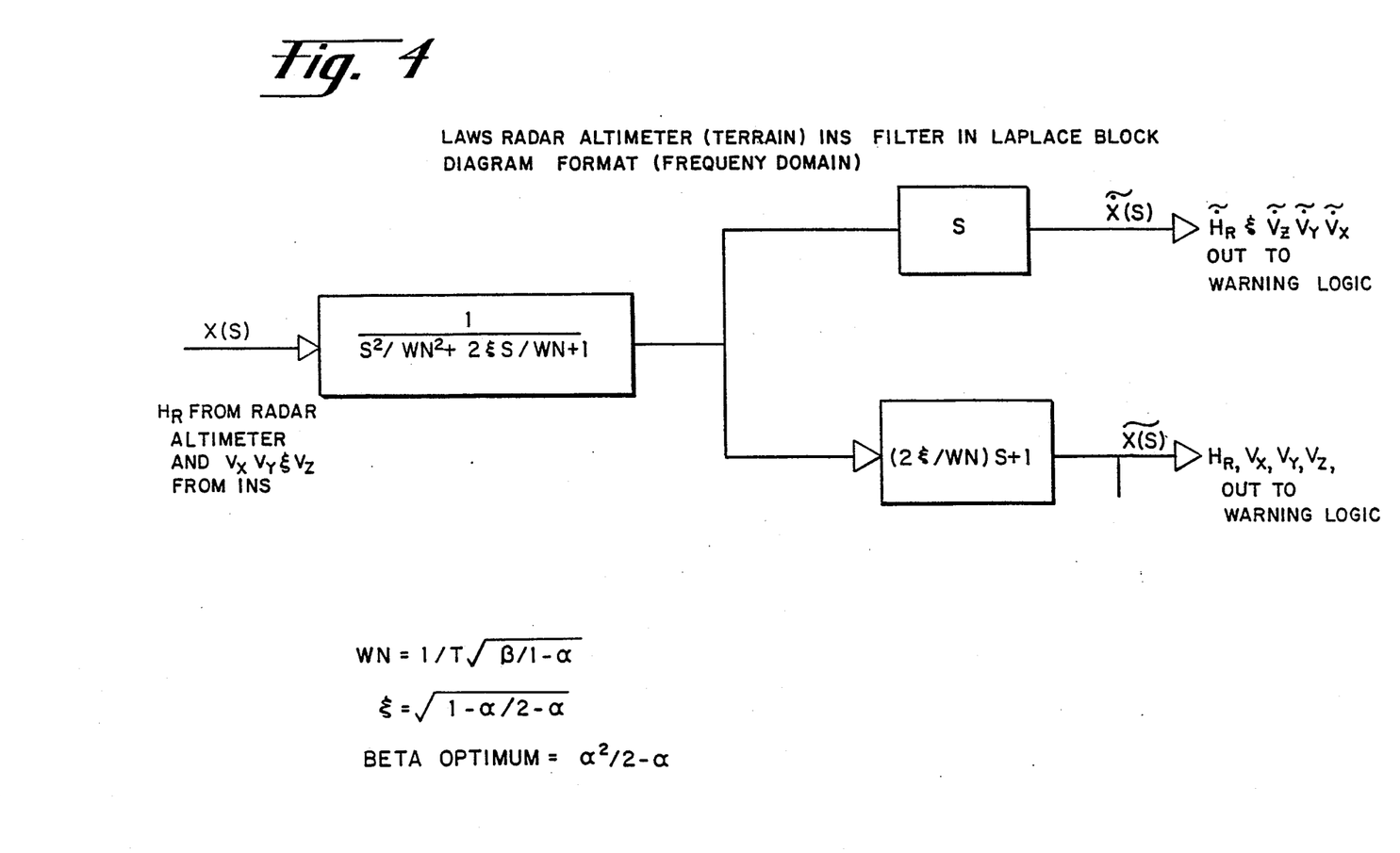
FIG. 4 is a diagram showing filter coefficients.

A diagram and equations for filter coefficients are shown in FIG. 4, a block diagram of the $\alpha, \beta$ filter 210 expressed in the frequency domain Laplace nomenclature. This filter is used on the incoming signals from the radar altimeter 18 and the INS 12 to provide filtered radar altitude and create a filtered radar altitude rate, as well as to provide filtered inertial velocities and create filtered inertial accelerations. The $\alpha, \beta$ coefficients are used in the equations under the block diagram which relate the frequency domain and time domain expressions. For the FILTER COEFFICIENTS; radar coefficients which have been flight tested are alpha=0.10000, beta=0.00526, T=0.02; INS coefficients which have been flight tested are alpha=0.2000, beta=0.02222, T=0.02; and faster INS coefficients which have been simulated but not flight tested are alpha=0.50000, beta=0.16672, T=0.02.

Figure 5A:
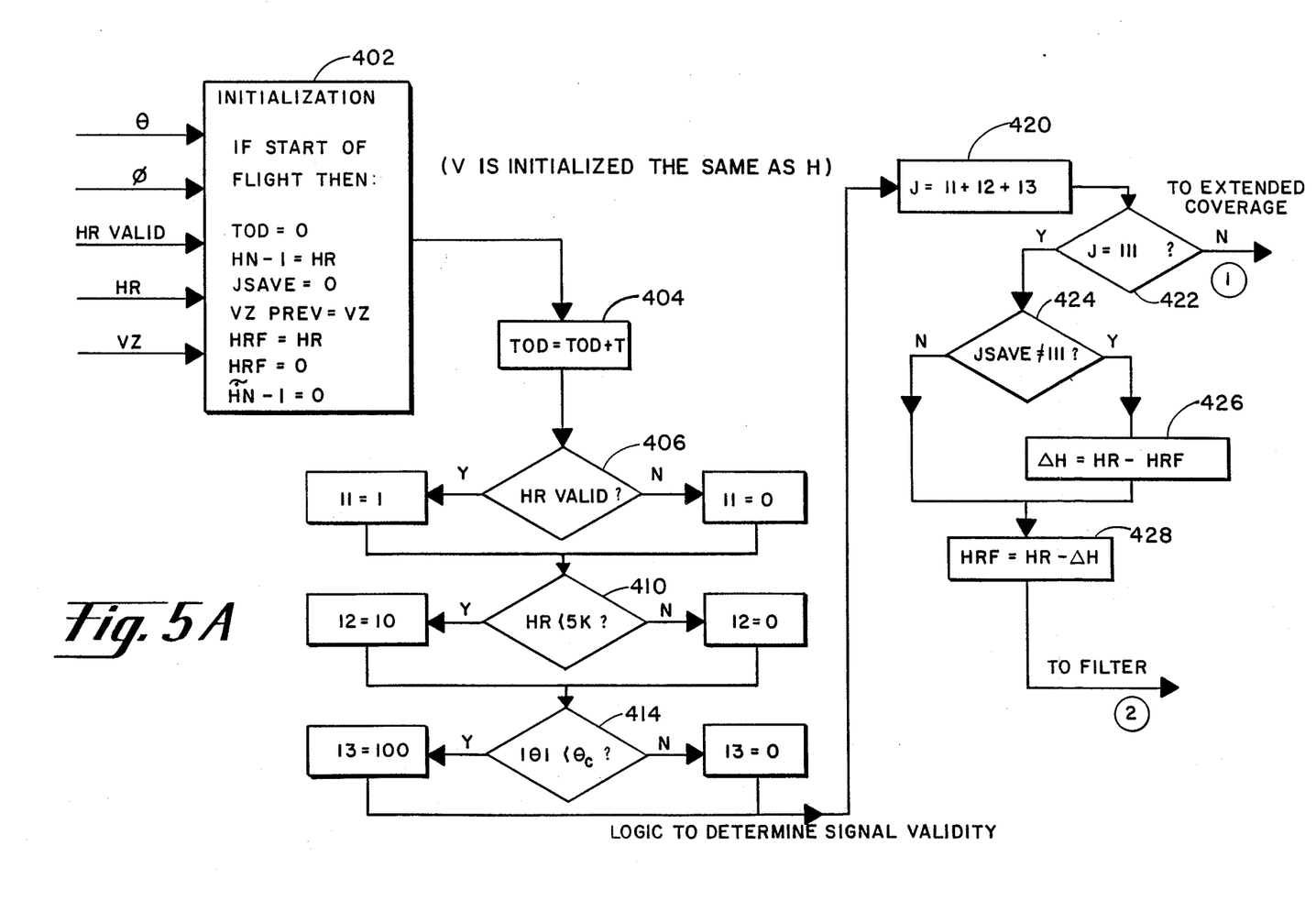
FIG. 5A, 5B and 5C comprise a flow chart of a filter operation with equations.
Figure 5B:
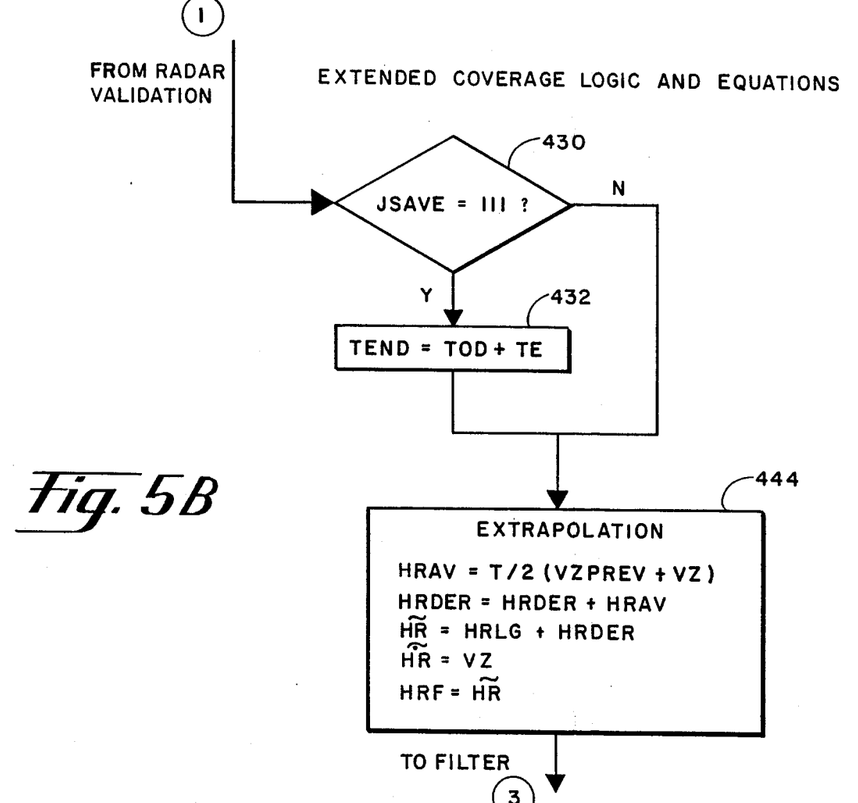
Figure 5C:
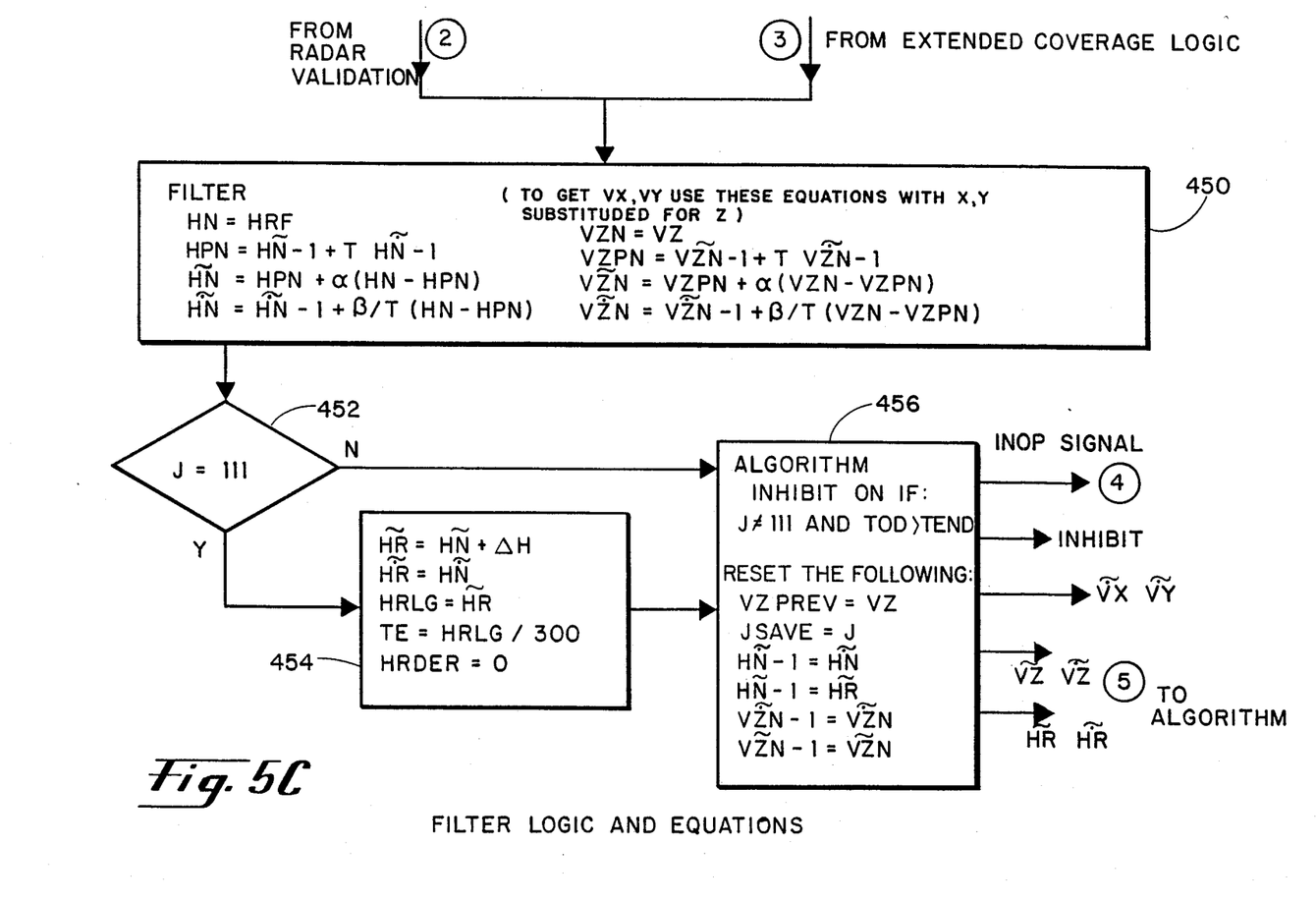

The filter logic of block 210 of FIG. 2 is shown by a flow chart in FIGS. 5A, 5B and 5C. FIG. 5A covers RADAR VALIDATION (logic to determine signal validity), FIG. 5B covers EXTENDED COVERAGE LOGIC AND EQUATIONS, and FIG. 5C covers the FILTER LOGIC AND EQUATIONS. This is the same filter as that shown in FIG. 4, but the equations are expressed only in the time domain.

In FIG. 5A, the inputs are pitch and bank angles (theta, phi) and inertial vertical velocity Vz from the INS unit 12, and radar altitude Hr and a "radar valid" signal from the radar altimeter 18. At the start of a flight, signal values are initialized as shown by block 402.

At box 404, the tiem of day TOD is incremented by T, which gives the time during flight calculated by adding the time of each iteration cycle from the start of the flight.

Logic to determine signal validity follows. At box 406, the validity bit determining whether the radar altimeter is providing correct information is checked. If valid, the flag I1 is set to 1, and otherwise to 0. At box 410, a check is made for radar altitude less than 5K, since the LAWS algorithm works only up to 5,000 feet. If less than 5K, the flag I2 is set to 10, and otherwise to 0. At box 414, a check is made for the pitch angle theta being less than a a value $\theta_C$. If true the airplane is inside the radar map, and the flag I3 is set to 100, and otherwise to 0.

At box 420, a J flag is set to 111 if the three flags I1, I2 and I3 show signal validity, and at box 422 the value is checked. If the value is 111, then at box 424 a flag JSAVE, the value of the J flag saved from the last iteration, is checked for the value 111. If JSAVE is not equal to 111, then via the "yes" branch from box 424 the logic goes to box 426, where the change of altitude ΔH is set equal to the radar altitude HR minus its previous filtered value HRF. From the "no" branch of box 424 or from box 426, the logic goes to box 428, where the the filtered value of the radar altitude is set to the radar altitude HR minus the change value ΔH.

If at box 422, the value of J is not 111, the logic goes via connector (1) to box 430 in FIG. 5B to check the value of the flag JSAVE for the value 111. If JSAVE is not equal to 111, then via the "yes" branch from box 430 the logic goes to box 432, where the the value of TEND, the time at which the extrapolation logic will stop coverage, is set equal to the sum of the time of day value TOD and TE, the length of time allowed to extrapolate. From the "no" branch of box 430 or from box 432, the logic goes to block 444.

At the extrapolation logic block 444, values are set for the average radar altitude, the value of radar altitude derived during extrapolation, the radar altitude (filtered), the radar altitude rate (filtered), and the filtered value of the radar altitude.

FIG. 5C shows the filter logic and equations. The filter block 450 is entered either from the radar validation logic via connector (2), or from the extended coverage logic via connector (3). The filter equations set values for the altitude H and the three components VX, VY and VZ of the inertial velocity, with each of these four factors being assigned to a new value, a predicted value, a filtered value, and a filtered value for altitude rate and initial acceleration.

A decision step 452 checks the radar validity flag, and if valid the logic goes to block 454, and if not to block 456 to provide an inhibit signal if the time of day TOD is greater than TEND, the time at which the extrapolation logic will stop coverage.

At block 454, when J equals 111, values are set for the radar altitude filtered value, filtered value for rate, last good value of radar altitude, the length of time allowed to extrapolate, and the value of radar altitude derived during extrapolation. The logic then goes to block 456 to reset the previous value of VZ, the JSAVE flag, the filtered altitude rate, the filtered altitude, the the filtered rate of VZ, and the filtered value of VZ.

WARNING COMPUTATION

Figure 3:
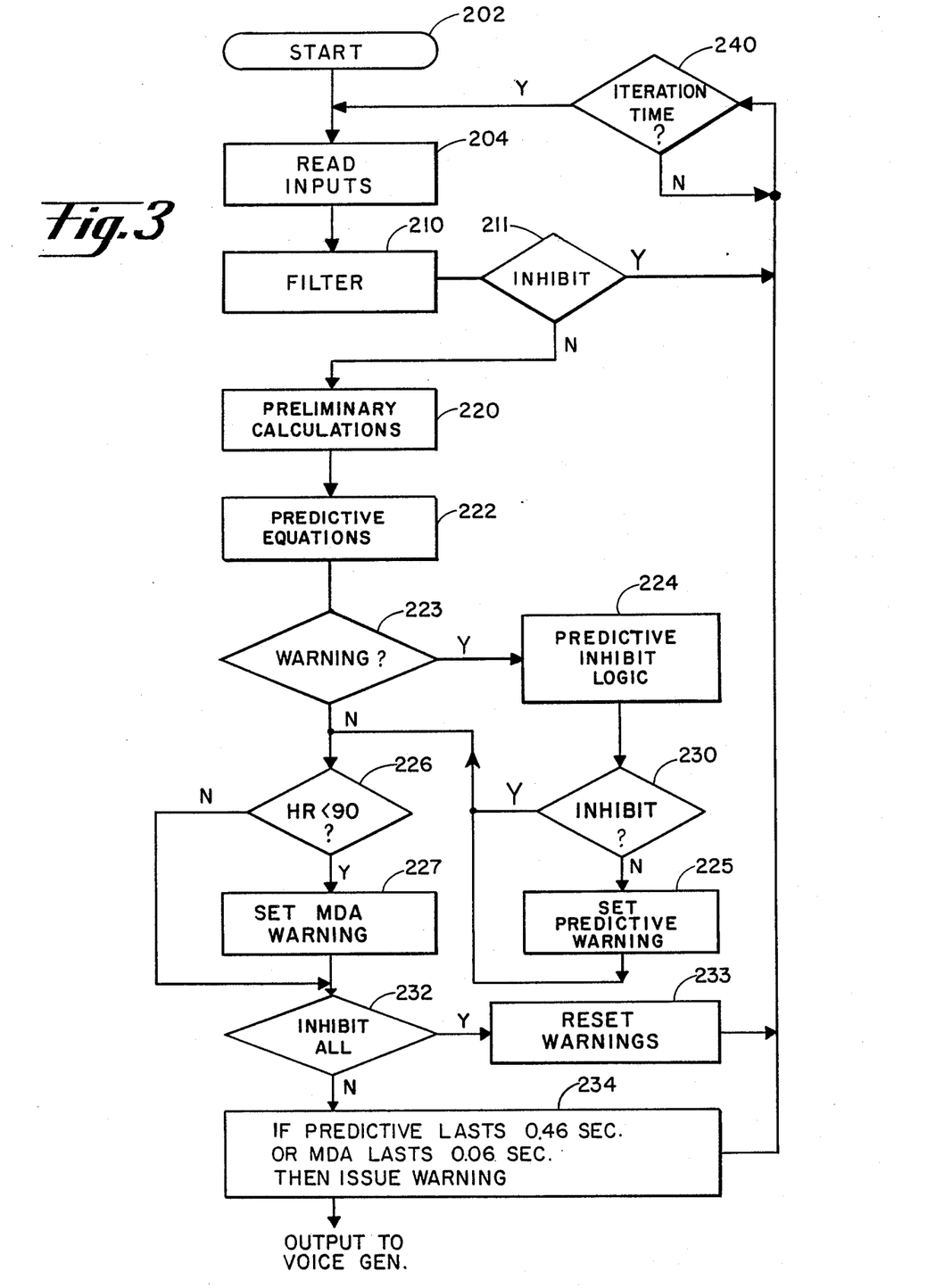
FIG. 3 is another flow chart showing the operation of the system.

The flow chart of FIG. 2 is shown in a different form in FIG. 3 to better illustrate the flow during an iteration cycle.

After the start of the program, at the beginning of each iteration, at block 204 the inputs are read into memory from the CADC 14, the INS 12 and the radar altimeter 18. The filter program 210 has been described above with respect to FIGS. 5A-5C. If the Inhibit output of block 456 in FIG. 5C is true, the iteration will be terminated at box 211.

At block 220, the preliminary calculations are performed, as shown in Table 1.

At block 222, the predictive factors are calculated, as shown in Table 2 and Table 3. If the IF statement at the bottom of FIG. 6 is true, then a predictive warning is indicated, and the program goes to block 224, to check the six factors shown in Table 3, to determine whether the predictive warning should be inhibited. If no inhibit is indicated at this point, a predictive warning flag is set at box 225, but if inhibit is indicated then the flag is not set.

The next determination is for the minimum design altitude (MDA). If the radar altitude is found to be less than 90 feet at box 226, the MDA warning is set at box 227.

At block 232, if the radar altitude is above 5000 feet, OR the gear is down, OR the gear is retracted AND the radar altitude is less than 115 feet, all warnings are hibited and the flags reset at box 233. If there are no inhibits, then at block 234 the warnings are timed. If a predictive warning flag lasts for 0.46 seconds, or an MDA warning lasts 0.06 seconds, then a warning signal is sent to the voice generator 30 (FIG. 1). As shown at block 30 in FIG. 1, there is a further 0.14 second hardware delay.

At the end of an iteration time (typically 20 milliseconds) checked at box 240, the program returns to the beginning of the next iteration.

POSSIBLE MODIFICATIONS

It should be emphasized in the pilots manual that the algorithm is to be treated as an emergency warning, and not to be used as a pilot's aid. In keeping with this principle, the flight tested algorithm provided an in-op light when the system was not operating due to a failure in an input system other than the radar altimeter or had had radar altimeter data for more than one second while still inside the radar map. The system did not provide an in-op light when the airplane was outside of its radar envelope. A suggestion is that the in-op light be placed so as not to be readily distracting to the pilot.

The algorithm was flight tested with a single warning call of "pull-up pull-up" for both the minimum design altitude (MDA) and predictive warnings. A settable low altitude warning (ALOW) was also included which gave a warning of "altitude altitude". These warnings follow the TAC directive of February 1986. The ALOW warning is not included in the attached system description. In flight test the warning also included a break-X indication on the HUD.

A Honeywell ANN/APN 224 altimeter was used for the later flight tests. This altimeter worked very satisfactorily after the receiver sensitivity was increased. The attached radar map was validated as being conservative by the flight test program, but would be applicable only for the APN 224 with the receiver mod, and the antenna installation flown. A reduction in radar system sensitivity at low altitude may help reduce a potential for lock-on to other aircraft in close proximity at high altitude.

Following are some examples of algorithm changes which may be implemented:

(1) In one flight test the radar altimeter picked up the wing man at 10,000 feet which caused the system to give a false warning. Logic additions or changing of the radar altimeter sensitivity may be solutions.

(2) In flight test Pilots commented that the abrupt change in the warning altitude at 75 degrees of bank during ridge clips is undesirable. This is due to the $f(\phi)$ value in the first inhibit. Changing this value to $\sin^6\phi$ has been considered, however, TAC (Tactical Air Command) indicated that the current version is clearer for pilot briefing. The test pilots suggested that provision be made to allow for programming of the block diagram $f(\phi)$ and $f(\phi) = \sin^6\phi$.

The coefficients in the Inertial Navigation System filter may be changed to reduce the lag in the vertical acceleration calculation. This was not possible with the Kaiser Head Up Display implementation due to fixed point arithmetic problems. This should not be a problem for the new implementation. The faster filter will remove a few nuisance warnings. We recommend reading the article "Synthesis of an Optimal Set of Radar Track-While-Scan Smoothing Equations" by T. R. Benedict and G. W. Bardner published July 1962 in IRE Transactions on Automatic Control, Vol. AC-7, No. 4, pages 27–32, alpha beta filter.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

TABLE 1
PRELIMINARY CALCULATIONS

$\alpha_c = 41.0925 + .067286 V_c (-6.334589 + .067286 V_c)$
$N_ZM = .951 \alpha_c S C_{LM}/Wt: s = 506\ ft^2\ C_{LM} = 1.4, Wt = 35,000\ lbs$
$N_ZM$ limiter: If $N_ZM \leq 1.05$ g then $N_ZM = 1.05$ g
$\gamma = \tan^{-1} [\widetilde{V}_z/(V_x^2 + V_y^2)^{\frac{1}{2}}]$
$\overline{\gamma} = \tan^{-1} [\widetilde{V}_z - 1\ [Hr]/(V_x^2 + V_y^2)^{\frac{1}{2}}]$
$V_I = (V_x^2 + V_y^2 + V_z^2)^{\frac{1}{2}}$
UNITS:
$V_c$ Knots
$V_I$ Ft/Sec
$\gamma, \overline{\gamma}$ degrees
$H_r$ Feet

TABLE 2
PREDICTIVE FACTORS

$$\Delta HD = - \left(2.5 + \frac{.6}{90} |\phi|\right) \widetilde{H}_r - \left(3.125 + \frac{3.13}{180} |\phi|\right) \widetilde{V}_z$$

$$\Delta HM = \frac{V_I^2}{9} \ln\left[\frac{N_ZM - \cos\gamma}{N_ZM - \cos\overline{\gamma}}\right]$$

$$\Delta HT = \frac{V_I}{9(N_ZM^2 - 1)^{\frac{1}{2}}} \left[C_1 \pi + C_2 \sin^{-1} \frac{.(1 - N_ZM \cos\overline{\gamma})}{(N_ZM - \cos\gamma)} + C_3 \sin^{-1} \frac{(1 - N_ZM \cos\overline{\gamma})}{(N_ZM - \cos\overline{\gamma})}\right](\widetilde{V}_z - \widetilde{H}_r)$$

SEE FIG. 6 
$\begin{cases} \text{I: } C_1 = C_2 = C_3 = 0 \\ \text{II: } C_1 = 0, C_2 = -1, C_3 = +1 \\ \text{III: } C_1 = C_2 = C_3 = 1 \text{ (includes } \gamma = 0) \\ \text{IV: } C_1 = 0, C_2 = 1, C_3 = -1 \end{cases}$ $HDB = 40 + \frac{50}{90} |\phi| - K\gamma(\gamma o - 10)^3 + K \frac{V_I^2}{V_s} \sin\gamma + \frac{1}{N_ZL} \frac{50}{90} |\phi|$, where $K\gamma = .00426 \frac{ft}{deg^3}$ $K = 2$, if $\gamma < 60°\ \gamma o = \gamma$ if $\gamma > 60°\ \gamma o = 60°$ $\hat{N}_ZL = 1$ if $\hat{N}_Z \leq 1, \hat{N}_ZL$ otherwise $\hat{N}_Z = \frac{-1}{g} [q_{31} \widetilde{V}_x + q_{32} \widetilde{V}_y - q_{33} \widetilde{V}_z - g \cos 0 \cos \phi]$ $q_{31} = SIN\phi SIN\psi + COS\phi SIN\theta COS\psi$ $q_{32} = COS\phi SIN\theta SIN\psi - SIN\phi COS\psi$ $q_{33} = COS\phi COS\theta$ IF $\widetilde{H}_r - \Delta HD - \Delta HM - \Delta HT - HDB < 0$, then issue Predictive Warning

TABLE 3
INHIBIT LOGIC

FOR A-10 APPLICATION:

INHIBIT PREDICTIVE WARNING IF:

1. $\gamma > -5°$ and $\widetilde{H}_r + f(\phi) \cdot 2 \widetilde{H}_r > 90$ ft or where $f(\phi) = \begin{bmatrix} 1 \text{ for } 75° < |\phi| < 110° \\ 0 \text{ otherwise} \end{bmatrix}$ or 2. $|\overline{\gamma}| > \tan^{-1}\left(\frac{125}{V_I} + \frac{125}{V_I}\left(\frac{HR^2}{1000}\right)\right)^{0-}\ |\overline{\gamma}|\ 30°$ or 3. $\widetilde{H}_r > -200$ fps and $\widetilde{V}_z > 10$ fps$^2$ or 4. $\widetilde{H}_r > -.1 V_I$ or 5. $N_Z \leq .5$ g and $\gamma \geq -15°$ and $|\phi| < 30°$ or 6. $V_c < 150$ kt

TABLE 4
DEFINITION OF TERMS

| | | | |
|---|---|---|---|
| qc | Dynamic pressure lbs ft$^2$ | $\widetilde{X}n$ | Filtered value |
| CLM | Maximum coefficient of lift (non dimensional) | $\widetilde{\widetilde{X}}n$ | Filtered value for rate |
| Nzm | Maximum load factor available g's | $\underline{X}pn$ | Predicted filter value |
| Wt | Weight lbs | Hr | Radar altitude (filtered) ft |
| s | Wing area ft$^2$ | $\widetilde{Hr}$ | Radar altitude Rate (Filtered) ft/sec |
| $\gamma$ | Flight path angle degrees | Vc | Calibrated Airspeed ft/sec |
| $\overline{\gamma}$ | Terrain slope degrees | VI | Intertial velocity ft/sec |

(explains notation for $\widetilde{X}n$, $\widetilde{\widetilde{X}}n$, $\underline{X}pn$)

TABLE 4-continued
DEFINITION OF TERMS

| Ñz | Load factor g's | M | Mach (non-dimensional) |
|---|---|---|---|

TABLE 5
RADAR MAP $\theta > 0 \quad 42° \leq \phi \leq 152°$ $$\theta_c = 43\sqrt{1 - \frac{\phi - 90^2}{63}}$$

$-152° \leq \phi \leq -42°$ $$\theta_c = 43\sqrt{1 - \frac{0 + 90^2}{63}}$$

$|\phi| < 42°$ $$\theta_c = 5 + 63\sqrt{1 - \frac{\phi^2}{43}}$$

$|\phi| > 152° \quad \theta_c = 0$ $\theta < 0 \quad 38° \leq \phi \leq 152°$ $$\theta_c = -43\sqrt{1 - \frac{\phi - 90^2}{63}}$$

$-152° \leq \phi \leq -38°$ $$\phi_c = -43\sqrt{1 - \frac{\phi + 90^2}{63}}$$

$|\phi| < 38° \quad \theta_c = -5 - 63\sqrt{1 - \frac{\phi^2}{43}}$ $|\phi| > 152° \quad \theta_c = 0$ $\theta$ is pitch angle, positive is up
$\phi$ is bank angle
$\theta_c$ is critical theta, which determines inside or outside radar map

What is claimed is:

1. A low altitude warning system for aircraft to provide a warning to the pilot of flight and terrain conditions which will result in a collision with the ground unless the pilot takes immediate action, without issuing excessive nuisance warnings, using a computer on board the aircraft, said low altitude warning system comprising:

input means providing input parameters from other aircraft systems, including radar altitude from a radar altimeter, inertial velocities (Vx, Vy, Vz), pitch and bank angles (theta, phi) from an inertial navigation system (INS), and calibrated airspeed (vc) from a central air data computer (CADC);
filter means for providing filtered signals of vertical inertial veocity (Vz), radar altitude (Hr), and rate of change of Vz and radar altitude from a low-pass (alpha-beta) filter, wherein the filter means receives inputs from the INS and the radar altimeter, and creates rate information;
predictive means having inputs from said input means and said filter means for issuing a warning based on a prediction of the time necessary for recovery from an excessive closure with terrain condition based on pilot reaction time, flight path angle, MDA, bank angle, airspeed, and terrain slope, a predictive warning being issued if the sum of the following predictive factors is greater than the radar altitude;
i. ΔHD=dynamic altitude effect, which comprises means for providing a factor which accounts for altitude lost until pilot reacts, includes a bank angle factor, and includes an empirical determination for a computed load factor which is a function of the rate of change of the filtered vertical inertial velocity multiplied by a factor which includes the absolute value of the bank angle and predetermined constants,
ii. HDB=dynamic bias, which comprises means for providing an analytical expression for computing the recovery altitude contribution of each of the terms MDA, bank angle, flight path angle, and airspeed,
iii. ΔHM=dive recovery factor, which comprises means for providing a factor which calculates recovery arc for a steady state dive recovery to get to flight path parallel to terrain, using an equation based on constant flight path angle, maximimum load factor and constant velocity at the time of the warning,
iv. ΔHT=terrain extrapolation equation, which comprises means for providing a factor which accounts for terrain growth based on slope of terrain, this being a hybrid of both rolling and diving type of maneuvers to arrive at predicted horizontal travel across terrain during recovery;
predictive inhibit means for inhibiting a warning under given conditions including conditions relating to dive angle, slope of terrain, and velocity;
warning means;
output means for activating the warning means responsive to a predictive warning from the predictive warning means which is not inhibited by the predictive inhibit means.

2. A low altitude warning system according to claim 1, which further includes MDA (minimum design altitude) warning means for issuing an MDA warning when the aircraft descends below a predetermined altitude above ground level.

3. A low altitude warning system according to claim 2,
wherein said predictive inhibit means includes means for inhibiting a warning in response to any of the following conditions being true:
i. a dive angle is less than a predetermined angle down and aircraft bank angle is outside of a predetermined region,
ii. slope of terrain is greater than a predetermined angle,
iii. rate of closure is less than a predetermined value down, and upward acceleration is sufficiently positive at least equal to a predetermined value, indicating the pilot has already initiated a recovery from an excessive closure with terrain condition, iv. rate of closure is less than a predetermined percent of total velocity,
v. the aircraft is in a bunt maneuver, defined as a load factor G, dive angle 15 degrees, and bank angle 30 degrees,
vi. velocity is less than a predetermined value.

4. A low altitude warning system according to claim 3,
further including further inhibit means for inhibiting all warnings in response to at least one of the following three conditions being true, (1) the radar altitude is greater than a given value, (2) the landing gear of the aircraft is down, (3) the landing gear is retracted AND the radar altitude is less than a given value;
persistence means for requiring a predictive warning to persist for a given time to activate the voice warning means, and requiring a MDA warning to persist a different given time before a warning is issued, there being means providing an added hardware delay in the voice warning means before activation of the voice signal;
said output means further includes means for activating the voice warning means responsive to an MDA warning from the MDA warning means, the predictive warning if not inhibited by the predictive inhibit means, or the MDA warning, being issued if not inhibited by the further inhibit means, and passed by the persistence means.

5. A low altitude warning system (LAWS) for aircraft to provide a warning to the pilot of flight and terrain conditions which will result in a collision with the ground unless the pilot takes immediate action, without issuing excessive nuisance warnings, the low altitude warning system being integrated into a HUD (heads up display) system in the aircraft, which includes a computer symbol generator (CSG), part of the HUD, which receives air data from a central air data computer (CADC) and inertial information from an inertial navigation system (INS) though a data bus, radar altitude information from a radar altimeter, and clearance altitude from switch means at a LAWS control panel to constantly monitor impending impact;
said low altitude warning system comprising voice warning means having a voice synthesizer, said radar altimeter having transceiver and antenna means providing radar coverage within a predetermined range of pitch and a predetermined range of roll;
wherein the LAWS control panel contains switches that allow the pilot to set a clearance altitude and a minimum altitude, and a "inop" (inoperative) light, means to illuminate the "inop" light if the CSG fails, or if the CSG receives an invalid inertial navigation unit (INU), central air data computer (CADC), or radar altimeter signal;
input means for providing signals as follows: inertial velocities (Vx, Vy, Vz), pitch and bank angles (theta, phi), and an "inop" signal from the Inertial Navigation System (INS); calibrated airspeed (vc), mach (M), and an "inop" signal from the Central Air Data Computer (CADC);
filter means for providing filtered signals of vertical inertial velocity (Vz), radar altitude (Hr), and rate of change of Vz and radar altitude from a low-pass (alpha-beta) filter, wherein the filter means receives inputs from the INS and the radar altimeter, creates rate information, and outputs signals to the "inop" light;
predictive means having inputs from said input means and said filter means for issuing a warning based on a prediction of the time necessary for recovery from an excessive closure with terrain condition based on pilot reaction time, flight path angle, MDA, bank angle, airspeed, and terrain slope, a predictive warning being issued if the sum of the following predictive factors is greater than the radar altitude:
i. $\Delta HD$=dynamic altitude effect, which comprises means for providing a factor which accounts for altitude lost until pilot reacts, includes a bank angle factor, and includes an empirical determination for a computed load factor which is a function of the rate of change of the filtered vertical inertial velocity multiplied by a factor which includes the absolute value of the bank angle and predetermined constants,
ii. HDB=dynamic bias, which comprises means for providing an analytical expression for computing the recovery altitude contribution of each of the terms MDA, bank angle, flight path angle, airspeed, and contains a Mach correction factor and empirically chosen correction factors,
iii. $\Delta HM$=dive recovery factor, which comprises means for providing a factor which calculates recovery arc for a steady state dive recovery from an excessive closure with terrain condition to get to flight path parallel to terrain, using an equation based on constant flight path angle, maximimum load factor and constant velocity at the time of the warning,
iv. $\Delta HT$=terrain extrapolation equation, which comprises means for providing a factor which accounts for terrain growth based on slope of terrain, this being a hybrid of both rolling and diving type of maneuvers to arrive at predicted horizontal travel across terrain during recovery from an excessive closure with terrain condition;
MDA (minimum design altitude) warning means for issuing an MDA warning when the aircraft descends below 90 feet above ground level, (the altitude that the aircraft should never penetrate);
predictive inhibit means for inhibiting a warning in response to any one of the following conditions being true;
i. a dive angle is less than 5 degrees down and aircraft bank angle is outside of 75-to-110 degrees region,
ii. slope of terrain is greater than 18 degrees,
iii. rate of closure is less than 200 ft/sec down, and upward acceleration is at least 10 ft/sec/sec, indicating the pilot has already initiated a recovery from an excessive closure with terrain condition,
iv. rate of closure is less than 10% of total velocity,
v. the aircraft is in a bunt maneuver, defined as a load factor G, dive angle 15 degrees, and bank angle 30 degrees,
vi. velocity is less than 150 kt;
further inhibit means for inhibiting all warnings in response to at least one of the following three conditions being true, (1) the radar altitude is greater than a given value, (2) the landing gear of the aircraft is down, (3) the landing gear is retracted AND the radar altitude is less than a given value;

persistence means for requiring a predictive warning to persist for 0.46 seconds to activate the warning signal, and requiring a MDA warning to persist 0.06 seconds before a warning is issued, there being an added 0.14 second hardware delay in the voice warning means before activation of the voice signal;

output means for activating the voice warning means responsive to a predictive warning from the predictive warning means or an MDA warning from the MDA warning means which is not inhibited by the predictive inhibit means and also is not inhibited by the further inhibit means, and which is passed by the persistence means.

* * * * *

UNITED STATES PATENT AND TRADEMARK OFFICE
CERTIFICATE OF CORRECTION

PATENT NO. : 4,916,448          Page 1 of 2

DATED : April 10, 1990

INVENTOR(S) : Wayne Thor

It is certified that error appears in the above-identified patent and that said Letters Patent is hereby corrected as shown below:

ABSTRACT, line 7, the period should be a comma.

Col 2, line 23, "problems" should be -- problem --.

Col 3, line 11, "amount" should be -- amounts --.

Col 6, line 38, "MDS" should be -- MDA --.

Col 6, line 48, "$\gamma$" should be -- $\bar{\gamma}$ --.

Col 8, line 16, "0.2000" should be -- 0.20000 --.

Col 8, line 34, "tiem" should be -- time --.

Col 9, line 14, "to" should be deleted.

Col 9, line 46, "Table 3" should be -- FIG. 6 --.

Col 9, line 47, "FIG. 6" should be -- Table 2 --.

Col 9, lines 60-61, "hibited" should be -- inhibited --.

Col 10, line 62, -- which explains the -- should follow "27-32,".

UNITED STATES PATENT AND TRADEMARK OFFICE
CERTIFICATE OF CORRECTION

PATENT NO. : 4,916,448
DATED : April 10, 1990
INVENTOR(S) : Wayne Thor It is certified that error appears in the above-identified patent and that said Letters Patent is hereby corrected as shown below:

Col 11, Table 1, line 7, the second occurrence of "-1" should be deleted.

Col 11, Table 2, line 4, the "$\gamma$" in the denominator should be -- $\bar{\gamma}$ --.

Col 11, Table 2, line 6, "$\gamma$" should be -- $\bar{\gamma}$ --.

Col 11, Table 2, line 7, "NzL" should be -- $\hat{N}_zL$ --.

Col 13, Claim 1, line 59, "(vc)" should be -- (Vc) --.

Col 13, Claim 1, line 61, "veocity" should be -- velocity --.

Col 15, Claim 5, line 61, "(vc)" should be -- (Vc) --.

Signed and Sealed this

Ninth Day of February, 1993

Attest:

STEPHEN G. KUNIN

Attesting Officer

Acting Commissioner of Patents and Trademarks